US010388100B2

(12) United States Patent
Zheng et al.

(10) Patent No.: US 10,388,100 B2
(45) Date of Patent: Aug. 20, 2019

(54) READING ASSEMBLY AND PAPER CURRENCY SORTER

(71) Applicant: SHANDONG NEW BEIYANG INFORMATION TECHNOLOGY CO., LTD, Shandong (CN)

(72) Inventors: Lei Zheng, Shandong (CN); Tao Gao, Shandong (CN); Bingqing Liu, Shandong (CN); Lu Sun, Shandong (CN); Chunkai Xu, Shandong (CN)

(73) Assignee: SHANDONG NEW BEIYANG INFORMATION TECHNOLOGY CO., LTD (CN)

( * ) Notice: Subject to any disclaimer, the term of this patent is extended or adjusted under 35 U.S.C. 154(b) by 0 days.

(21) Appl. No.: 15/747,598

(22) PCT Filed: Jul. 26, 2016

(86) PCT No.: PCT/CN2016/091709
§ 371 (c)(1),
(2) Date: Jan. 25, 2018

(87) PCT Pub. No.: WO2017/016471
PCT Pub. Date: Feb. 2, 2017

(65) Prior Publication Data
US 2018/0218559 A1    Aug. 2, 2018

(30) Foreign Application Priority Data

Jul. 29, 2015 (CN) .................... 2015 2 0558303 U

(51) Int. Cl.
*G06K 7/08*    (2006.01)
*G07D 11/18*    (2019.01)
(Continued)

(52) U.S. Cl.
CPC ............. *G07D 11/18* (2019.01); *G06K 7/087* (2013.01); *G07D 7/121* (2013.01); *G07D 11/10* (2019.01);
(Continued)

(58) Field of Classification Search
CPC ........ G06K 7/087; G07D 7/181; G07D 11/18; G07D 11/14; G07D 11/50; G07D 13/00;
(Continued)

(56) References Cited

U.S. PATENT DOCUMENTS 5,657,980 A * 8/1997 Cargill .................. B65H 29/58
271/3.05
6,220,419 B1 * 4/2001 Mennie .................. B65H 3/063
194/207
(Continued)

FOREIGN PATENT DOCUMENTS

CN          1904950 A        1/2007
CN        102037498 A        4/2011
(Continued)

OTHER PUBLICATIONS

International Search Report dated Nov. 1, 2016; International Patent Application No. PCT/CN2016/091709 filed Jul. 26, 2016; ISA/CN.

*Primary Examiner* — Seung H Lee
(74) *Attorney, Agent, or Firm* — McDonald Hopkins LLC

(57) ABSTRACT

Disclosed are a reading assembly and a paper currency sorter. The reading assembly includes a reading component and a frame. The frame includes a first side wall and a second side wall being disposed oppositely to each other. The reading component is disposed between the first side wall and the second side wall. A first end surface of the reading component is in insertion connection with the first side wall through an insertion member. The insertion member is in linear contact or point contact with the first side
(Continued)

wall, and can pivot on a contact position relative to the first side wall in the process of assembling. A second end surface of the reading component is fixedly connected with the second side wall through a connection piece.

20 Claims, 4 Drawing Sheets

(51) Int. Cl.
*G07D 11/50* (2019.01)
*G07D 7/121* (2016.01)
*G07D 11/10* (2019.01)
*G07D 11/40* (2019.01)
*G07D 11/14* (2019.01)
*G07D 7/181* (2016.01)

(52) U.S. Cl.
CPC ............ *G07D 11/40* (2019.01); *G07D 11/50* (2019.01); *G07D 7/181* (2017.05); *G07D 11/14* (2019.01); *G07D 2207/00* (2013.01); *G07D 2211/00* (2013.01)

(58) Field of Classification Search
CPC .......... G07D 2207/00; G07D 2211/00; G07D 11/0084; H04N 1/0249; H04N 2201/02404; H04N 2201/02454; H04N 2201/02485; H04N 2201/02495
USPC ...................................................... 235/440
See application file for complete search history.

(56) References Cited

U.S. PATENT DOCUMENTS

| 6,636,624 | B2* | 10/2003 | Raterman | G06Q 20/18 382/135 |
| 6,959,800 | B1* | 11/2005 | Mazur | G07D 7/04 194/207 |
| 7,166,827 | B2* | 1/2007 | Sugihara | H01L 27/14625 250/208.1 |
| 8,259,364 | B2* | 9/2012 | Tokida | H04N 1/40056 358/461 |
| 2002/0130257 | A1* | 9/2002 | Krohn | H04N 1/00909 250/239 |
| 2007/0212996 | A1* | 9/2007 | Ryou | G07D 3/06 453/13 |
| 2008/0062491 | A1* | 3/2008 | Nakamura | B41J 2/471 359/200.1 |
| 2010/0020421 | A1* | 1/2010 | Shimmo | G02B 7/021 359/811 |
| 2012/0162722 | A1* | 6/2012 | Allen | H04N 1/02481 358/474 |
| 2013/0050768 | A1* | 2/2013 | Hill | H04N 1/0249 358/296 |
| 2016/0037011 | A1* | 2/2016 | Fujiuchi | H04N 1/0315 358/471 |
| 2017/0223212 | A1* | 8/2017 | Nakatani | F21V 17/02 |

FOREIGN PATENT DOCUMENTS

| CN | 203573393 U | 4/2014 |
| CN | 203588362 U | 5/2014 |
| CN | 204833440 U | 12/2015 |
| JP | 57-39448 B2 | 8/1982 |

* cited by examiner

READING ASSEMBLY AND PAPER CURRENCY SORTER

CROSS-REFERENCE TO RELATED APPLICATION

This application is a 35 U.S.C. 371 national stage filing of PCT Application No. PCT/CN2016/091709 filed on Jul. 26, 2016, which claims priority to Chinese Patent Application No. 201520558303.5 filed on Jul. 29, 2015, each of which are incorporated herein in their entirety by reference.

TECHNICAL FIELD

The present disclosure relates to the field of self-service equipment, and for example relates to a reading assembly and a paper currency sorter utilizing the reading assembly.

BACKGROUND

Financial equipment, such as a currency count machine, a currency identifying device, a paper currency sorter and a cheque scanner and the like, is generally provided with a reading assembly used for reading image information and/or magnetic information on a medium such as a paper currency, a cheque and the like so as to judge the authenticity of the medium.

FIG. 1 is a structural schematic diagram illustrating a reading assembly in a related art. As shown in FIG. 1, the reading assembly includes a reading component 1' and a frame 2'. The reading component 1' may be an image sensor for reading image information and may also be a magnetic head for reading the magnetic information. The frame 2' includes a first side wall 21' and a second side wall 22' which are arranged at an interval in parallel as well as a connection wall 23' vertically connected between the first side wall 21' and the second side wall 22'. The interval between the first side wall 21' and the second side wall 22' is matched with a length of the reading component F. In the process of assembling, the reading component 1' is placed between the first side wall 21' and the second side wall 22'; threaded holes 11' at both ends of the reading component 1' are respectively aligned with through holes in the first side wall 21' and the second side wall 22'; then screws 3' are connected with the threaded holes 11' of the reading component 1' in a threading manner but not tightened after passing through the through holes in the frame 2'. A reference surface of a craft equipment is used for determining a position of a reading surface 12' of the reading component F. At this time, the reading surface 12' of the reading component 1' is required to be abutted against the reference surface of the craft equipment. Finally the screws 3' are tightened to complete the assembling of the reading assembly.

The inventor discovers that a problem with the reading assembly is when the reading component 1' is installed, the first side wall 21' and the second side wall 22' restraint the position adjustment of the reading assembly 1', so that it is difficult to ensure that the reading surface 12' extending along a length direction of the reading component 1' is sufficient fitted with the reference surface of the craft equipment. Especially a first end, of the reading surface 12' close to the first side wall 21' and a second end of the reading surface 12' close to the second side wall 22' are difficult to be sufficiently fitted with the reference surface of the craft equipment simultaneously. The screws 3' at both ends of the reading component 1' are required to be repeatedly adjusted and even the positions of the first side wall 21' and the second side wall 22' of the frame 2' are required to be adjusted to meet the assembling requirement. Therefore, the assembling efficiency of such reading assembly is low.

SUMMARY

The present disclosure provides a reading assembly, which solves the technical problems in a related art that the poor fitting tolerance and the low assembling efficiency between both ends of a reading surface of a reading assembly and a craft equipment reference surface in a manner of enabling an insertion member to be in linear contact or point contact with a first side wall.

The present disclosure further provides a paper currency sorter, which solves the technical problems in the related art that the poor fitting tolerance and the low assembling efficiency between a reading surface of a reading assembly of the paper currency sorter and a craft equipment reference surface by adopting the reading assembly described above.

On one hand, the present disclosure provides a reading assembly, including a reading component and a frame.

The frame includes a first side wall and a second side wall.

The first side wall and the second side wall are disposed oppositely at an interval.

The reading component is disposed between the first side wall and the second side wall.

A first end surface of the reading component is inserted with the first side wall through an insertion member, the insertion member is in linear contact or point contact with the first side wall, and the insertion member can pivot on a contact position between the insertion member and the first side wall relative to the first side wall in the process of assembling.

A second end surface of the reading component is fixedly connected with the second side wall through a connection piece.

Optionally, the first side wall is provided with a first through hole, a hole wall of the first through hole is provided with a protruding portion which protrudes along a radial direction of the first through hole, and the protruding portion is in linear contact or point contact with the insertion member.

Optionally, a boundary line of an axial section of the first through hole includes two sections of opposite arcs or two sections of opposite V-shaped lines.

Optionally, the first side wall is provided with the first through hole, the insertion member has a protruding portion which protrudes along the radial direction of the insertion member and is in linear contact or point contact with the first through hole.

Optionally, a boundary line of an axial section of the insertion member includes two sections of opposite arcs or two sections of opposite V-shaped lines.

Optionally, the insertion member includes a fastener and a sleeve.

The fastener passes through the sleeve.

A length of the fastener is greater than the length of the sleeve, and the length of the sleeve is greater than a thickness of the first side wall.

The fastener is in threaded connection with the first end surface, and an outer circumferential surface of the sleeve is in linear contact or point contact with the hole wall of the first through hole.

Optionally, the insertion member includes an insertion portion and a connection portion which are coaxially and fixedly connected with each other, external threads are arranged on the connection portion; an outer diameter of the insertion portion is greater than an outer diameter of the connection portion, and a length of the insertion portion is greater than a thickness of the first side wall.

The connection portion is in threaded connection with the first end surface, and an outer circumferential surface of the insertion portion is in linear contact or point contact with the hole wall of the first through hole.

Optionally, the second side wall is provided with a second through hole, and the connection piece passes through the second through hole and is in threaded connection with the second end surface.

Optionally, the insertion member can move relative to the first side wall along an axial direction of the insertion member and/or can rotate around an axis of the insertion member.

On the other hand, the present disclosure further provides a paper currency sorter, including any one of the above reading assembly.

Optionally, the reading component of the reading assembly is a magnetic head or an image sensor.

The reading assembly according to the present disclosure includes the reading component and the frame. The first end surface of the reading component is inserted with the first side wall of the frame through an insertion member; and the insertion member is in linear contact or point contact with the first side wall, so that the insertion member can pivot on the contact position. In the process of assembling, the reference surface of the craft equipment is only required to be abutted against the first end of the reading surface, the second end of the reading surface is biased towards the craft equipment reference surface, the reading component pivot on the linear contact or point contact position relative to the first side wall so as to adapt to the reference surface, thereby ensuring the complete fitting between the reading surface of the reading component and the reference surface. Compared with the related art, the reading assembly according to the present disclosure is simple in assemble steps in the process of assembling and easily to be assembled, and the fitting degree of both ends of the reading surface of the reading assembly with the craft equipment reference surface is better.

The paper currency sorter according to the present disclosure adopts the above reading assembly. It can be known from the above analysis that compared with the related art, the paper currency sorter according to the present disclosure has simple assemble steps and good assembling ability, the reading surface of the reading assembly may fit with the reference surface of the craft equipment better in the process of assembling, and particularly the fitting degree of the first end and second end of the reading surface can better fit with the reference surface of the craft equipment simultaneously.

DETAILED DESCRIPTION

The present disclosure is described below in detail through embodiments in combination with drawings.

A First Embodiment

Figure 1:
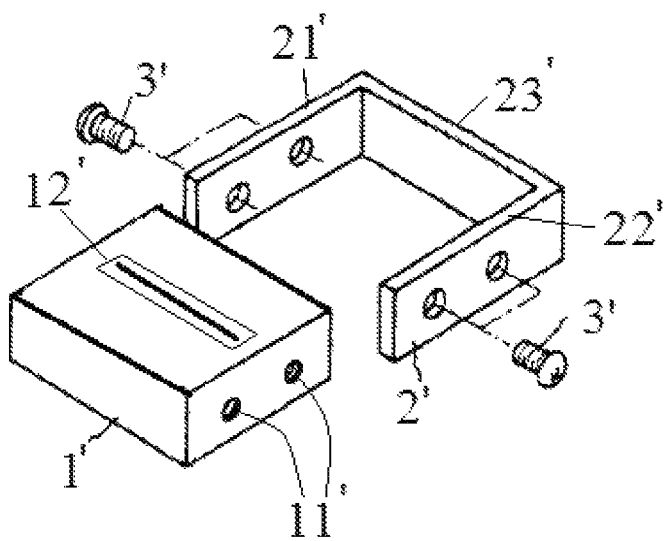
FIG. 1 is a structural schematic diagram illustrating a reading assembly in a related art.
Figure 2:
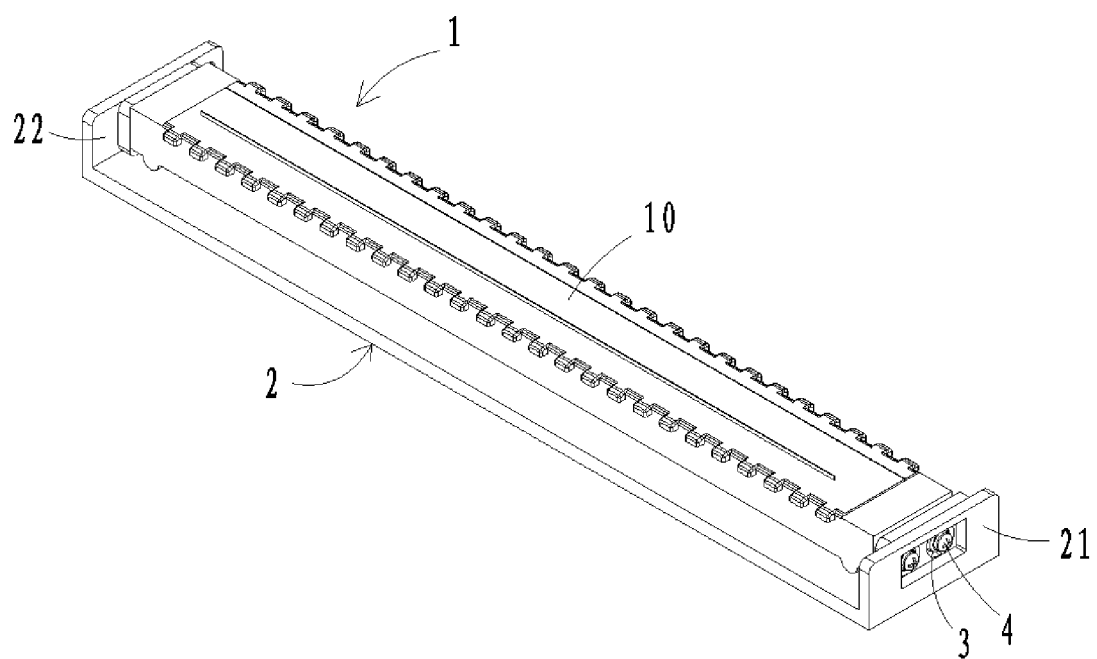
FIG. 2 is a structural schematic diagram illustrating a reading assembly according to a first embodiment of the present disclosure.
Figure 3:
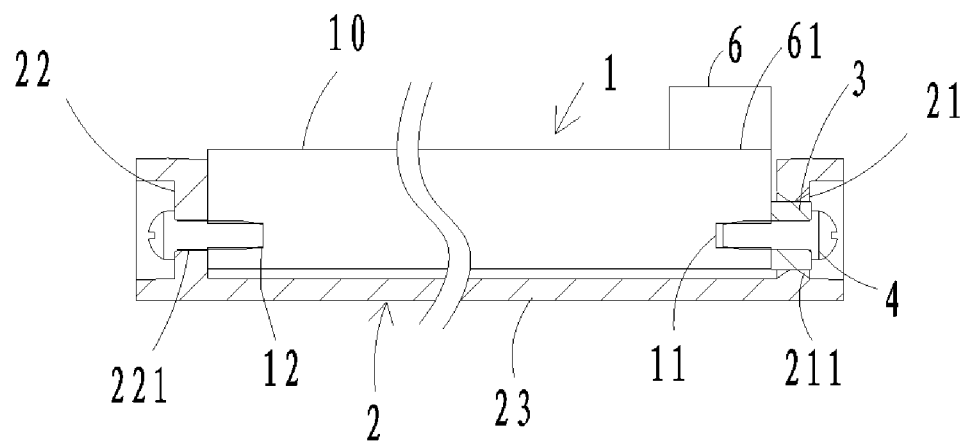
FIG. 3 is a structural sectional view illustrating a reading assembly according to the first embodiment of the present disclosure.
Figure 4:
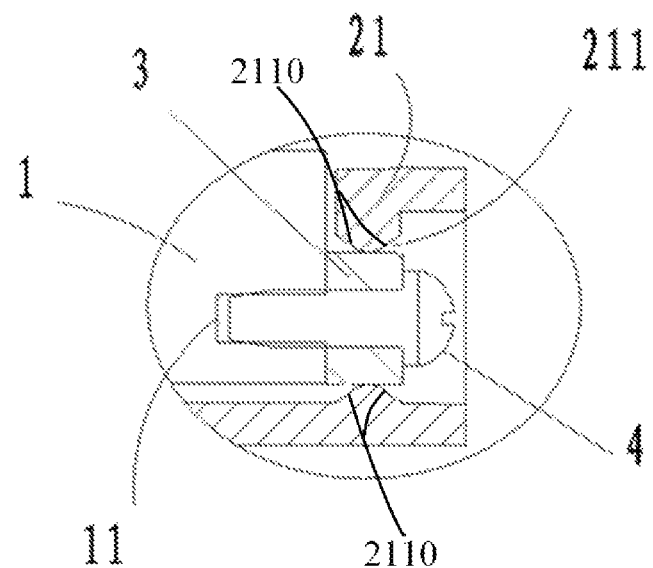
FIG. 4 is a local structural enlarged view illustrating a reading assembly according to the first embodiment of the present disclosure.

Referring to FIG. 2 to FIG. 4, the present embodiment provides a reading assembly, including a reading component 1 and a frame 2. In FIG. 3 and FIG. 4, in order to more clearly display two sections of arcs of an axial section of a first through hole 211 of a first side wall, vertical line segments for indicating an orifice of the first through hole 211 are omitted.

The frame 2 includes a first side wall 21 and a second side wall 22 which are disposed oppositely. Optionally, the frame 2 further includes a connection wall 23 vertically disposed between the first side wall 21 and the second side wall 22. The reading component 1 is disposed between the first side wall 21 and the second side wall 22. Optionally, the reading component 1 may be an image sensor or a magnetic head. In the present embodiment, the reading component 1 is a contact image sensor and is of a cuboid structure. A reading surface 10 of the reading component 1 is disposed on a surface extending along a length direction of the reading component 1. A length of the reading surface 10 extends along the length direction of the reading component 1. The reading component 1 has a first end surface and a second end surface which are opposite to each other in the length direction of the reading surface 10. A distance between the first end surface and the second end surface is smaller than that between the inner surface of the first side wall 21 and the inner surface of the second side wall 22. The first end surface and the first side wall 21 are facing each other and are inserted with each other through an insertion member. The insertion member is in linear contact or point contact with the first side wall 21, and is configured to pivot on a contact position relative to the first side wall 21 in the process of assembling. The second end surface and the second side wall 22 are facing each other and are fixedly inserted through a connection piece. In order to facilitate the description, one end of the reading surface 10 close to the first end surface of the reading component 1 is referred to as a first end of the reading surface 10, and the other end of the reading surface 10 close to the second end surface of the reading component 1 is referred to as a second end of the reading surface 10.

The insertion member is in linear contact or point contact with the first side wall. Optionally, the insertion member passes through a first through hole 211 provided on the first side wall 21 and is in threaded connection with the threaded hole 11 in the first end surface. As shown in the drawings, optionally, the first end surface is provided with two threaded holes 11 with a defined depth at an interval. The first side wall 21 is provided with two first through holes 211 corresponding to the two threaded holes 11 of the first end surface of the reading component 1 respectively. A hole wall of the first through hole 211 of the first side wall 21 has a protruding portion which protrudes along the radial direction of the first through hole 211. The protruding portion is in linear contact or point contact with an outer circumferential surface of the insertion member.

In an optional solution of the present embodiment, the protruding portion is configured to form a whole circle so that the first through hole 211 is made into a specially-shaped hole. A diameter of the specially-shaped hole is gradually reduced as approaching the center position of the first side wall 21 in the direction of the wall thickness. Optionally, an axial sectional shape of the specially-shaped hole consists of two sections of opposite arcs 2110 or two sections of opposite V-shaped line segments 2110. Optionally, the specially-shaped hole can adopt a structure of the arc or V-shaped line segments. The structure is regular, the swinging amplitude controllability is high, and the processing technology is simple. In the present embodiment, the axial sectional shape of the specially-shaped hole is exemplarily formed by two sections of opposite arcs, as shown in FIG. 4.

In an optional solution of the present embodiment, the insertion member suitable for the above first through hole 211 of the first side wall 21 can include a fastener 4 and a sleeve 3 through which the fastener 4 passes. A length of the fastener 4 is greater than the length of the sleeve 3, and the length of the sleeve 3 is greater than the thickness of the first side wall 21. The fastener 4 is in threaded connection with the threaded hole 11. The outer circumferential surface of the sleeve 3 is in linear contact or point contact with the first through hole 211 of the first side wall 21. Optionally, the fastener 4 is a screw. A diameter of an inner hole of the sleeve 3 is adapted with an outer diameter of a screw rod portion of the screw. When an outer circumference of the sleeve 3 is in insertion fit with the first through hole 211 (such as the specially-shaped hole) in the first side wall 21, the outer circumferential surface of the sleeve 3 is in linear contact with the first through hole 211. At this time, the sleeve 3 can pivot on a linear contact position relative to the first side wall 21. The length of the sleeve 3 is greater than the thickness of the first side wall 21, and a distance between the first end surface and the second end surface is smaller than that between the inner surface of the first side wall 21 and the inner surface of the second side wall 22, so that a certain gap is formed between the first end surface and the first side wall 21 for providing a space for the position adjustment of the first end surface relative to the first side wall 21 in the process of assembling.

In the optional solution of the present embodiment, the second end surface is provided with a threaded hole 12, and the second side wall 22 is provided with a second through hole 221. The connection piece passes through the second through hole 221 of the second side wall 22 and is in threaded connection with the threaded hole 12 of the second end surface. For example, the connection piece may be, but not limited to a screw. The second end surface may be provided with two threaded holes 12 at an interval, and the second side wall 22 may be provided with two second through holes 221 corresponding to the two threaded holes 12 of the second end surface respectively. It should be stated that the position of the threaded hole 12 of the second end surface is different from that of the threaded hole 11 of the first end surface, and the shape and the position of the second through hole 221 of the second side wall 22 are different from those of the first through hole 211 of the first side wall 21, so that different reference numerals are given respectively to the threaded holes in two locations and the through holes in two locations for distinguishing.

In general, when the reading component 1 is assembled, the reading component 1 is disposed between the first side wall 21 and the second side wall 22 of the frame 2. After two sleeves 3 are inserted into the two first through holes 211 (such as the specially-shaped hole) in the first side wall 21 respectively, the two sleeves 3 are abutted against the first end surface of the reading component 1 and are aimed to the two threaded holes 11 in the first end surface of the reading component 1 respectively. One end of the each of two sleeves 3 away from the reading component 1 protrudes out of the outer surface of the first side wall 21. Two fasteners 4 are then in threaded connection with the two threaded holes 11 of the first end surface of the reading component 1 without being tightened after passing through inner holes of the two sleeves 3 from the outer side of the first side wall 21 respectively. Next, two fasteners 4 pass through the two through holes 221 in the second side wall 22 and are in threaded connection with the two threaded holes 12 of the second end surface of the reading component 1 without being tightened. Then a reference surface is abutted against the first end of the reading surface 10 of the reading component 1, and the second end of the reading surface 10 is biased towards the reference surface. Since the first end surface of the reading component 1 is in insertion fit with the first through hole 211 (such as the specially-shaped hole) in the first side wall 21 through the sleeve 3, the first end of the reading surface 10 is stationary relative to the reference surface. The sleeves 3 can drive the reading component 1 to pivot on the linear contact or point contact position relative to the first side wall 21, so that the second end of the reading surface 10 is fitted with the reference surface, thereby enabling the reading surface 10 of the reading component 1 to be completely fitted with the reference surface. As shown in FIG. 3, the reference surface may be formed by a craft equipment 6. The craft equipment 6 has a reference surface 61. In the process of assembling, the position of the craft equipment 6 is fixed. Then, the first end of the reading surface 10 is fitted with the reference surface 61, and the sleeves 3 drive the reading component 1 to pivot on the linear contact or point contact position relative to the first side wall 21, so that the second end of the reading surface 10 is fitted with the reference surface 61, thereby enabling the whole reading surface 10 of the reading component 1 to be completely fitted with the reference surface 61. The reference surface may also be formed by a plane of other components of the device utilizing the reading assembly. Finally, the two fasteners 4 connected with the first side wall 21 are tightened at first, and then the two fasteners 4 connected with the second side wall 22 are tightened, thereby completing the assembling of the reading assembly.

The reading assembly according to the present embodiment is provided with two specially-shaped holes in the first side wall of the frame. The first end surface of the reading component is in insertion fit with two specially-shaped holes through the two sleeves, so that the two sleeves are in linear contact or point contact with the first side wall. In the process of assembling, the first end of the reading surface is only required to be abutted against the reference surface, then the second end of the reading surface is biased and the reading component pivots on the linear contact or point contact position relative to the first side wall, so that the second end of the reading surface is fitted with the reference surface, thereby enabling the reading surface to be completely fitted with the reference surface. Prior to the tightening of the insertion member and the connection piece, the insertion member can move relative to the first side wall along the axial direction of the insertion member and/or rotate around the axis of the insertion member, thereby ensuring the fitting between the reading surface of the reading component and the reference surface. Compared with the related art, the reading assembly according to the present disclosure is simple in assemble steps in the process of assembling and easily to be assembled.

A Second Embodiment

The present embodiment provides a reading assembly. The reading assembly provides another structural solution of an insertion member on the basis of the first embodiment. Features other than the insertion member in the first embodiment also belong to the present embodiment and are not repeated.

Figure 5:
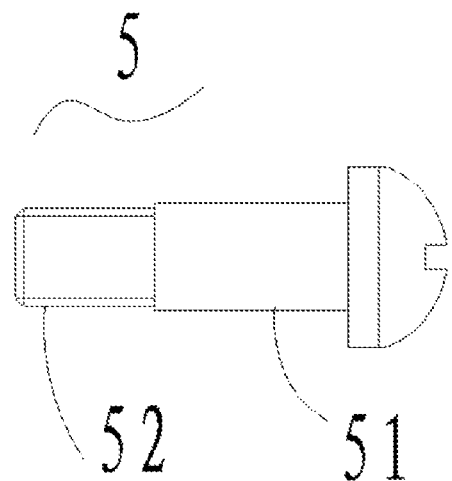
FIG. 5 is a structural schematic diagram illustrating an insertion member of a reading assembly according to a second embodiment of the present disclosure.

As shown in FIG. 5, the insertion member 5 included in the reading assembly in the present embodiment is configured to include an insertion portion 51 and a connection portion 52 which are coaxially and fixedly connected with each other. An outer diameter of the insertion portion 51 is adapted with a minimum inner diameter of the first through hole 211 (such as a specially-shaped hole) of the first side wall 21, and a length thereof is greater than a thickness of the first side wall 21. The connection portion 52 is provided with an external thread for threaded connection with the first end surface of the reading component 1, for example, for threaded connection with the threaded hole 11 in the first end surface. Optionally, an outer diameter of the insertion portion 51 is greater than the outer diameter of the connection portion 52. The length of the insertion portion 51 is greater than the thickness of the first side wall 21, and a distance between the first end surface and the second end surface is smaller than that between the inner surface of the first side wall and the inner surface of the second side wall, so that a certain gap is formed between the first end surface and the first side wall, thereby providing a space for position adjustment of the first end surface relative to the first side wall in the assembling process.

In combination with FIGS. 2 to 4, when the reading assembly is assembled, the reading component 1 is placed between the first side wall 21 and the second side wall 22 of the frame 2. Two insertion members 5 are in threaded connection with the two threaded holes 11 in the first end surface of the reading component 1 without being tightened after passing through the two first through holes 211 (such as specially-shaped holes) in the first side wall 21 respectively. At this time, the insertion portion 51 is in insertion fit with the first through holes 211 (such as the specially-shaped holes). Next, two fasteners 4 pass through two second through holes 221 in the second side wall 22 and are in threaded connection with the two threaded holes 12 of the second end surface of the reading component 1 without being tightened. Then the first end of the reading surface 10 is abutted against the reference surface; and the second end of the reading surface 10 is biased towards the reference surface. Since the first end surface of the reading component 1 is in insertion fit with the first through holes 211 (such as the specially-shaped holes) in the first side wall 21 through the insertion portion 51, the insertion member 5 can drive the reading component 1 to pivot on the linear contact or point contact position relative to the first side wall 21, so that the second end of the reading surface 10 is fitted with the reference surface, enabling the reading surface 10 of the reading component 1 to be completely fitted with the reference surface. Finally, the two insertion members 5 connected with the first side wall 21 are tightened at first, and then the two connection pieces 4 connected with the second side wall 22 are tightened, thereby completing the assembling of the reading assembly.

A Third Embodiment

The present embodiment provides a reading assembly. The reading assembly provides another implementing solution of linear contact or point contact between the insertion member and the first side wall on the basis of the first embodiment. Other technical features other than this in the first embodiment are also applicable to the present embodiment and are not repeated herein.

Figure 6:
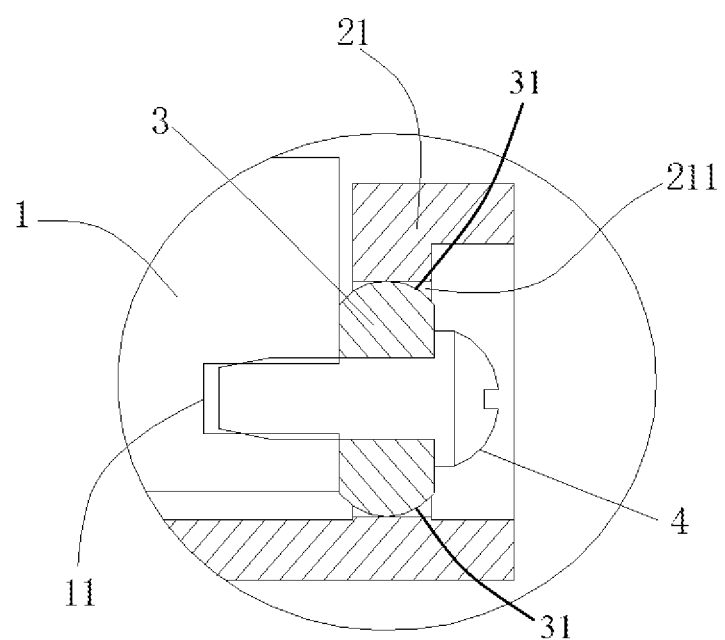
FIG. 6 is a local structural enlarged view illustrating a reading assembly according to a third embodiment of the present disclosure.

As shown in FIG. 6, the insertion member is in linear contact or point contact with the first side wall. Specifically, the insertion member passes through the first through hole 211 provided on the first side wall 21 and is in threaded connection with the first end surface. For example, the first end surface is provided with two threaded holes 11 at an interval, and the first side wall 21 is provided with two first through holes 211 corresponding to the two threaded holes 11. The insertion member has a protruding portion which protrudes along a radial direction of the insertion member and is in linear contact or point contact with the hole wall of the first through hole 211 of the first side wall 21.

In an optional solution of the present embodiment, the insertion member includes a fastener 4 and a sleeve 3 through which the fastener 4 passes. The fastener 4 is in threaded connection with the threaded hole 11 of the first end surface. Optionally, the fastener 4 is a screw. A diameter of an inner hole of the sleeve 3 is adapted with an outer diameter of a screw rod portion of the screw. A length of the fastener 4 is greater than the length of the sleeve 3, and the length of the sleeve 3 is greater than the thickness of the first side wall 21. An outer circumferential surface of the sleeve 3 is provided with a protruding portion which protrudes radially and is matched with the first through hole 211 of the first side wall 21. Optionally, a boundary line of an axial section of the sleeve 3 includes two sections of opposite arcs 31 or two sections of opposite V-shaped lines 31. The structure enables the appearance of the sleeve 3 to be regular, thereby improving the swinging controllability of the first end surface relative to the first side wall 21, and decreasing processing cost.

In another optional solution of the present embodiment, an improvement is made as follows on the basis of the technical solution of the second embodiment. the insertion member is configured to include an insertion portion and a connection portion which are axially and fixedly connected with each other, an outer circumferential surface of the insertion portion is provided with a protruding portion which protrudes radially to be in linear contact or point contact with the inner wall of the through hole of the first side wall, and the connection portion is provided with external threads to be in threaded connection with the threaded holes. Other features and solution advantages are the same as those of the first embodiment and are not repeated.

The Fourth Embodiment

The present embodiment provides a paper currency sorter. The paper currency sorter adopts any reading assembly described in the first to third embodiments.

Figure 7:
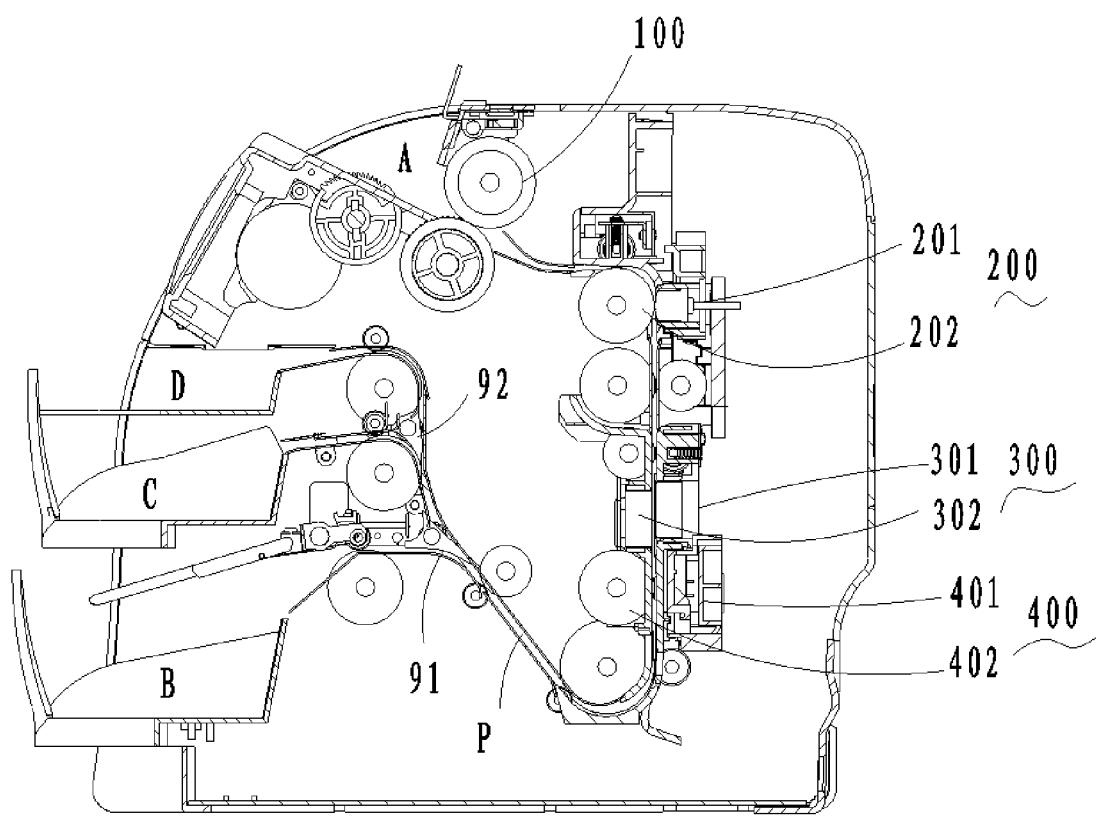
FIG. 7 is a structural schematic diagram illustrating a paper currency sorter according to a fourth embodiment of the present disclosure.

As shown in FIG. 7, the paper currency sorter includes a paper currency transfer passage P, and a paper feeding mechanism 100, a first magnetic detection mechanism 200, an image detection mechanism 300, a second magnetic detection mechanism 400 and a reversing mechanism which are successively distributed along the paper currency transfer passage P. The paper currency transfer passage P is provided with a paper currency inlet A, a first paper currency outlet B, a second paper currency outlet C and a third paper currency outlet D which are communicated with outside.

The paper feeding mechanism 100 is used for feeding one paper currency after another stacked at the paper currency inlet A to the first magnetic detection mechanism 200. The first magnetic detection mechanism 200 is used for detecting magnetic information of a safety line on the paper currency which may be a magnetic line extending along a width or length direction of the paper currency and traversing the paper currency. The first magnetic detection mechanism 200 may include a first magnetic head component 201 and a first pressure roller 202. The first magnetic head component 201 may adopt a reading assembly according to any one of the above embodiments. A magnetic head of the first magnetic head component 201 is a reading component. A structural form and an operation principle of the first magnetic head component 201 refer to the description of any one of the above embodiments and are not repeated herein. The first magnetic head component 201 is disposed on a first side of the paper currency transfer passage P. A reading surface of the magnetic head of the first magnetic head component 201 faces the paper currency in the paper currency transfer passage P. The first pressure roller 202 is disposed on a second side of the paper currency transfer passage P and disposed opposite to the magnetic head of the first magnetic head component 201. The image detection mechanism 300 is used for acquiring image information of both sides of the paper currency. The image detection mechanism 300 includes a first image sensor component 301 and a second image sensor component 302 which are disposed opposite to each other. The first image sensor component 301 may adopt the reading assembly according to any of the above embodiments. A contact image sensor of the first image sensor component 301 is the reading component, and a structural form and an operation principle of the first image sensor component 301 refer to the description of any one of the above embodiments. The first image sensor component 301 is disposed on the first side of the paper currency transfer passage P. The reading surface of the contact image sensor (CIS) of the first image sensor component 301 faces a first side (such as, a front side) of the paper currency and is used for reading image information of the front side of the paper currency. The second image sensor component 302 can adopt the reading assembly according to any of the above embodiments. A contact image sensor of the second image sensor component 302 is the reading component, and a structural form and an operation principle of the second image sensor component 302 refer to the description of any one of the above embodiments. The second image sensor component 302 is disposed on the second side of the paper currency transfer passage P. The reading surface of the CIS of the second image sensor component 302 faces a second side (such as a back side) of the paper currency and is used for reading the image information of the back side of the paper currency. The second magnetic detection mechanism 400 is used for detecting a magnetic mark on the paper currency which may be formed by printing ink containing a magnetic material. The second magnetic detection mechanism 400 includes a second magnetic head component 401 and a second pressure roller 402. The second magnetic head component 401 may adopt a reading assembly according to any of the above embodiments. A magnetic head of the second magnetic head component 401 is a reading component, and a structural form and an operation principle of the second magnetic head component 401 refer to the description of the above embodiments and are not repeated herein. The second magnetic head component 401 is disposed on a first side of the paper currency transfer passage P, and a reading surface of the magnetic head of the second magnetic head component 401 faces the paper currency in the paper currency transfer passage P. The second pressure roller 402 is disposed on a second side of the paper currency transfer passage P and is disposed opposite to the magnetic head of the second magnetic head component 401.

The reversing mechanism is used for guiding the paper currency to enter different paper currency outlets of the paper currency transfer passage, i.e., the first paper currency outlet B, the second paper currency outlet C or the third paper currency outlet D according to detection results of the first magnetic detection mechanism 200, the image detection mechanism 300 and the second magnetic detection mechanism 400. The reversing mechanism includes a first reversing plate 91, a second reversing plate 92, a first driving piece (not shown in the drawing) for driving the first reversing plate 91 and a second driving piece (not shown in the drawing) for driving the second reversing plate 92.

The first reversing plate 91 is arranged at a junction between the paper currency transfer passage P and the first paper currency outlet B and is movably connected with a frame (not shown in the drawing) of the paper currency sorter. The first driving piece may be a cam or an electromagnet and the like, and is in lap joint with the first reversing plate 91. Under the driving of the first driving piece, the first reversing plate 91 has a first position and a second position. When the first reversing plate 91 is in the first position, the paper currency transfer passage P is communicated with the first paper currency outlet B, and the paper currency disposed inside the paper currency transfer passage P can be fed to the first paper currency outlet B through the first reversing plate 91. When the first driving piece drives the first reversing plate 91 to move to the second position, the first paper currency outlet B is closed by the first reversing plate 91, and the paper currency can be only moved towards the second paper currency outlet C along the paper currency transfer passage P.

The second reversing plate 92 is arranged at a junction between the paper currency transfer passage P and the second paper currency outlet C and is movably connected with the frame. The second driving piece may be a cam or an electromagnet and the like, and is in lap joint with the second reversing plate 92. Under the driving of the second driving piece, the second reversing plate 92 has a first position and a second position. When the second reversing plate 92 is in the first position, the paper currency transfer passage P is communicated with the second paper currency outlet C, and the paper currency disposed inside the paper currency transfer passage P can be fed to the second paper currency outlet C through the second reversing plate 92. When the second driving piece drives the second reversing plate 92 to move to the second position, the second paper currency outlet C is closed by the second reversing plate 92, and the paper currency can only be fed to the third paper currency outlet D.

When the paper currency sorter is operated, the paper feeding mechanism 100 feeds one paper currency after another into the paper currency transfer passage P. The paper currencies successively pass through the first magnetic detection mechanism 200, the image detection mechanism 300 and the second magnetic detection mechanism 400. The paper currency sorter judges whether the paper currency is authentic or counterfeit or recovered according to a detection result of each detection mechanism. When a controller judges that the paper currency is authentic and good in surface condition to be capable of being circulated, the controller controls the first driving piece to drive the first reversing plate 91 to move to a first position, and the paper currency is fed to the first paper currency outlet B. When the controller judges that the paper currencies are authentic but bad in surface conditions, such as broken corners, adhesive tapes attached, wearing and the like (i.e., recovered paper currencies) to be not suitable for circulation, the controller controls the first driving piece to drive the first reversing plate 91 to move to the second position and controls the second driving piece to drive the second reversing plate 92 to move to the first position so as to feed the paper currencies to the second paper currency outlet C. When the controller judges that the paper currency is counterfeit, the controller controls the first driving piece to drive the first reversing plate 91 to move to the second position and controls the second driving piece to drive the second reversing plate 92 to move to the second position so as to feed the paper currencies to the third paper currency outlet D.

The paper currency sorter in the present embodiment utilizes the reading assembly according to the present disclosure, thereby realizing simple assemble steps and good assembling ability.

The above descriptions are only optional embodiments of the present disclosure, not intended to limit the present disclosure. For those skilled in the art, a variety of modifications and changes can be made to the present disclosure. Any modification, equivalent replacement, improvement and the like made within the principle of the present disclosure shall be included in a protection scope of the present disclosure.

What is claimed is:

1. A reading assembly comprising:
   a reading component and a frame, wherein the frame comprises a first side wall and a second side wall being disposed oppositely at an interval, and the reading component is disposed between the first side wall and the second side wall;
   a first end surface of the reading component is inserted with the first side wall through an insertion member, the insertion member is in linear contact or point contact with the first side wall, and the insertion member is capable of pivoting on a contact position between the insertion member and the first side wall relative to the first side wall in the process of assembling; and
   a second end surface of the reading component is fixedly connected with the second side wall through a connection piece.

2. The reading assembly according to claim 1, wherein the first side wall is provided with a first through hole, a hole wall of the first through hole is provided with a protruding portion which protrudes along a radial direction of the first through hole, and wherein the protruding portion is in linear contact or point contact with the insertion member.

3. The reading assembly according to claim 2, wherein a boundary line of an axial section of the first through hole comprises two sections of opposite arcs or two sections of opposite V-shaped lines.

4. The reading assembly according to claim 3, wherein the insertion member comprises a fastener and a sleeve, wherein the fastener passes through the sleeve, wherein a length of the fastener is greater than the length of the sleeve, and the length of the sleeve is greater than a thickness of the first side wall, wherein the fastener is in threaded connection with the first end surface, and wherein an outer circumferential surface of the sleeve is in linear contact or point contact with the hole wall of the first through hole.

5. The reading assembly according to claim 3, wherein the insertion member comprises an insertion portion and a connection portion which are coaxially and fixedly connected with each other, external threads are arranged on the connection portion, an outer diameter of the insertion portion is greater than an outer diameter of the connection portion, and a length of the insertion portion is greater than a thickness of the first side wall, wherein the connection portion is in threaded connection with the first end surface, and wherein an outer circumferential surface of the insertion portion is in linear contact or point contact with the hole wall of the first through hole.

6. The reading assembly according to claim 3, wherein the second side wall is provided with a second through hole, and the connection piece passes through the second through hole and is in threaded connection with the second end surface.

7. The reading assembly according to claim 3, wherein the insertion member is operative to move relative to the first side wall along an axial direction of the insertion member, or is operative to rotate around an axis of the insertion member, or the insertion member is operative to move relative to the first side wall along an axial direction of the insertion member, and is operative to rotate around an axis of the insertion member.

8. The reading assembly according to claim 3, wherein the insertion member comprises a fastener and a sleeve, wherein the fastener passes through the sleeve, wherein a length of the fastener is greater than the length of the sleeve, and the length of the sleeve is greater than a thickness of the first side wall, wherein the fastener is in threaded connection with the first end surface, and wherein an outer circumferential surface of the sleeve is in linear contact or point contact with the hole wall of the first through hole.

9. The reading assembly according to claim 2, wherein the insertion member comprises a fastener and a sleeve, wherein the fastener passes through the sleeve, wherein a length of the fastener is greater than the length of the sleeve, and the length of the sleeve is greater than a thickness of the first side wall, wherein the fastener is in threaded connection with the first end surface, and wherein an outer circumferential surface of the sleeve is in linear contact or point contact with the hole wall of the first through hole.

10. The reading assembly according to claim 2, wherein the insertion member comprises an insertion portion and a connection portion which are coaxially and fixedly connected with each other, external threads are arranged on the connection portion, an outer diameter of the insertion portion is greater than an outer diameter of the connection portion, and a length of the insertion portion is greater than a thickness of the first side wall, wherein the connection portion is in threaded connection with the first end surface, and wherein an outer circumferential surface of the insertion portion is in linear contact or point contact with the hole wall of the first through hole.

11. The reading assembly according to claim 2, wherein the second side wall is provided with a second through hole, and the connection piece passes through the second through hole and is in threaded connection with the second end surface.

12. The reading assembly according to claim 2, wherein the insertion member is operative to move relative to the first side wall along an axial direction of the insertion member, or is operative to rotate around an axis of the insertion member, or the insertion member is operative to move relative to the first side wall along an axial direction of the insertion member, and is operative to rotate around an axis of the insertion member.

13. The reading assembly according to claim 1, wherein the first side wall is provided with the first through hole, the insertion member has a protruding portion which protrudes along the radial direction of the insertion member and is in linear contact or point contact with the first through hole.

14. The reading assembly according to claim 13, wherein a boundary line of an axial section of the insertion member comprises two sections of opposite arcs or two sections of opposite V-shaped lines.

15. The reading assembly according to claim 1, wherein the insertion member comprises a fastener and a sleeve, wherein the fastener passes through the sleeve, wherein a length of the fastener is greater than the length of the sleeve, and the length of the sleeve is greater than a thickness of the first side wall, wherein the fastener is in threaded connection with the first end surface, and wherein an outer circumferential surface of the sleeve is in linear contact or point contact with the hole wall of the first through hole.

16. The reading assembly according to claim 1, wherein the insertion member comprises an insertion portion and a connection portion which are coaxially and fixedly connected with each other, external threads are arranged on the connection portion, an outer diameter of the insertion portion is greater than an outer diameter of the connection portion, and a length of the insertion portion is greater than a thickness of the first side wall, wherein the connection portion is in threaded connection with the first end surface, and wherein an outer circumferential surface of the insertion portion is in linear contact or point contact with the hole wall of the first through hole.

17. The reading assembly according to claim 1, wherein the second side wall is provided with a second through hole, and the connection piece passes through the second through hole and is in threaded connection with the second end surface.

18. The reading assembly according to claim 1, wherein the insertion member is operative to move relative to the first side wall along an axial direction of the insertion member, or is operative to rotate around an axis of the insertion member, or the insertion member is operative to move relative to the first side wall along an axial direction of the insertion member, and is operative to rotate around an axis of the insertion member.

19. A paper currency sorter, wherein the paper currency sorter comprises the reading assembly of claim 1.

20. The paper currency sorter according to claim 19, wherein the reading component of the reading assembly is a magnetic head or an image sensor.

* * * * *